United States Patent
Bachmann

(10) Patent No.: US 7,935,014 B2
(45) Date of Patent: May 3, 2011

(54) DRIVE SYSTEM FOR INDIVIDUALLY DRIVING TWO DRIVE WHEELS OF A DRIVE WHEEL PAIR

(75) Inventor: Max Bachmann, Bad Waldsee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 698 days.

(21) Appl. No.: 11/817,987

(22) PCT Filed: Mar. 6, 2006

(86) PCT No.: PCT/EP2006/002007
§ 371 (c)(1),
(2), (4) Date: Sep. 7, 2007

(87) PCT Pub. No.: WO2006/094730
PCT Pub. Date: Sep. 14, 2006

(65) Prior Publication Data
US 2008/0167153 A1    Jul. 10, 2008

(30) Foreign Application Priority Data
Mar. 8, 2005 (DE) .......... 10 2005 010 514

(51) Int. Cl.
*F16H 3/72* (2006.01)
(52) U.S. Cl. .............................. 475/5; 475/9
(58) Field of Classification Search ........... 475/6, 8, 475/9, 21, 150, 151; 180/371, 372
See application file for complete search history.

(56) References Cited

U.S. PATENT DOCUMENTS

| | | | |
|---|---|---|---|
| 5,285,866 A | 2/1994 | Ackroyd | |
| 5,445,234 A | 8/1995 | Hall, III | |
| 5,927,417 A | 7/1999 | Brunner et al. | |
| 6,105,704 A | 8/2000 | Hamada et al. | |
| 6,358,176 B1 | 3/2002 | Nauheimer et al. | |
| 7,201,691 B2 | 4/2007 | Witzenberger et al. | |
| 2004/0121871 A1 | 6/2004 | Thompson | |
| 2008/0202826 A1* | 8/2008 | Freudenreich | 180/6.5 |

FOREIGN PATENT DOCUMENTS

| | | |
|---|---|---|
| DE | 598 720 | 6/1934 |
| DE | 1 555 338 | 10/1970 |
| DE | 69 10 335 | 5/1974 |
| DE | 28 48 106 | 5/1980 |
| DE | 37 28 171 A1 | 3/1989 |
| DE | 198 23 980 A1 | 12/1999 |
| DE | 198 50 606 A1 | 5/2000 |
| DE | 697 02 231 T2 | 2/2001 |
| DE | 102 46 870 B3 | 4/2004 |
| WO | WO-02/40304 A1 | 5/2002 |

* cited by examiner

*Primary Examiner* — Edwin A. Young
(74) *Attorney, Agent, or Firm* — Davis & Bujold, P.L.L.C.

(57) ABSTRACT

A drive system for individually driving two wheels of a drive wheel pair of a vehicle. The drive system has two infinitely variable transmission drives which are drivingly connected, via a transmission arrangement, to an associated drive wheel. Each transmission arrangement includes two transmission units arranged one behind the other, with one of the transmission units preferably being a two-stage shiftable transmission and the other transmission unit being a bevel gear transmission. The shiftable transmission makes it possible to vary the drive transmission ratio. The bevel gear transmission makes it possible to arrange the transmission drives so that their drive shafts are at right angles to the rotational axis of the drive wheel pairs.

6 Claims, 3 Drawing Sheets

DRIVE SYSTEM FOR INDIVIDUALLY DRIVING TWO DRIVE WHEELS OF A DRIVE WHEEL PAIR

This application is a national stage completion of PCT/EP2006/002007 filed Mar. 6, 2006, which claims priority from German Application Serial No. 10 2005 010 514.9 filed Mar. 8, 2005.

FIELD OF THE INVENTION

The invention relates to a drive system for the individual drive of both drive wheels of a drive wheel pair or the like for a motor vehicle.

BACKGROUND OF THE INVENTION

Drive systems have been installed for a considerable time, for example in motor vehicles with differential steering, thus in motor vehicles in which the drive wheels (or sprockets of a tracked vehicle) on the inside of the curve are slowed in relation to the drive wheels on the outside of the curve, while negotiating the curve. Moreover, infinitely variable transmission drives permit practically any rotational speed ratio between the drive wheels on the inside of the curve and the drive wheels on the outside of the curve. Nonetheless, it has become apparent that infinitely variable transmission drives reach their limits in terms of end velocity and drive torque if a gearbox arrangement, with a fixed gear ratio, is connected downstream of them. A further disadvantage is also evident in relation to spatial considerations in that it is frequently difficult to install two drive groups consisting of a drive motor, a gearbox arrangement and wheel in alignment with one another in the direction of the rotational axis of the drive wheel pair next to one another and to configure them in a drive axle arrangement.

With this as a background, the object of the invention is to create a drive system which, first, makes it possible to vary the final velocity or the drive torque and second, permits easy installation into a motor vehicle.

SUMMARY OF THE INVENTION

The invention is based upon the recognition that this object can be achieved with relatively simple constructive by dividing the two sub-objectives, mentioned above, between two transmission units, one designed to alter the transmission ratio and the other is designed to improve installation conditions.

Accordingly, the invention proceeds from a drive system for individually driving the two wheels of a drive wheel pair or the like of a motor vehicle comprising two infinitely variable transmission drives which are each drivingly connected by way of a transmission arrangement to an associated drive wheel.

To achieve this object, based on a drive system of this type, it is provided that the transmission arrangement in each case comprises two transmission units arranged one behind the other; one of the transmission units is a shiftable transmission and the other transmission unit is a bevel gear transmission with a fixed ratio.

Using a two-stage shiftable transmission, for example, two rotational speeds or drive torque ranges can be pre-selected, while the bevel gear transmission makes it possible to arrange the transmission drive and, if need be, one of the two transmission units at right angles to the axis of rotation of the drive wheels, which considerably improves the installation options, as will be explained with reference to exemplary embodiments.

In a preferred embodiment of the invention, it is provided that the shiftable transmission is a two-stage bevel gear transmission wherein the sun gear is connected to a drive shaft, the planetary gear carrier is connected to an output shaft and the ring gear can be selectively locked against rotation or can be coupled with the output shaft.

Bevel gear transmissions allow comparatively high transmission ratios with a compact design. Shifting by way of the ring gear, which is optionally lockable or can be connected to the drive shaft or to the planetary gear carrier, which is securely fastened to the drive shaft, again provides a high gear ratio with low construction costs.

Depending on the existing construction conditions, it can be provided that the shiftable transmission is downstream of the transmission drive and that the bevel gear transmission is downstream of the shiftable transmission, or conversely, that the bevel gear transmission is downstream of the transmission drive and the shiftable transmission is downstream of the bevel gear transmission.

A preferred embodiment of the invention provides that the drive shafts of the transmission drive are each arranged at right angles to the axis of rotation of the drive wheel pair, and that the bevel gear transmission features a deflection angle of 90°. In this way, the transmission drives can be arranged in front of and behind the axis of rotation of the drive wheel pair, for example in the longitudinal axis of the vehicle, so that the transmission arrangements connected downstream of them can be placed near the longitudinal axis of the motor vehicle and can be connected by way of comparatively long cardan shafts to the independent spring suspension drive wheels.

According to a further embodiment of the invention, downstream of the transmission arrangement, which consists of two transmission units, there is an additional, non-shiftable summation gear with a first transfer element and a second transfer element to transmit the combined drive torques, which act on an output element, where the first two transfer elements of the two summation units are coupled to the second transfer elements by way of the first gear train driven by the first transmission drive and the second gear train driven by the second transmission drive respectively, and where the transmission ratios of the gear trains with the transfer elements are unequal and in opposite directions.

Such an arrangement makes it possible to transfer drive output uncalled for by the slowed curve-side drive wheel of a drive wheel pair to the respective drive wheel on the outside of the curve as will be explained in detail with reference to an exemplary embodiment. The concept of "unequal and in opposite directions" is understood as an arrangement in which the unequal transmission ratios of the gear trains with the transfer elements of the first or second summation unit are opposed and selected, such that they balance out, so that at the same rotational speed of the two transmission drives, the associated drive wheels also have equal rotational speed.

The transmission drives are preferably electric motors whose rotational speed can be regulated in a simple manner.

The drive system is preferably used with motor vehicles where the drive wheels have independent spring suspension, where they are connected by way of cardan shafts to the associated transmission drives or the downstream transmission units.

BRIEF DESCRIPTION OF THE DRAWINGS

The invention will now be described, by way of example, with reference to the accompanying drawings in which.

DETAILED DESCRIPTION OF THE INVENTION

Figure 1:
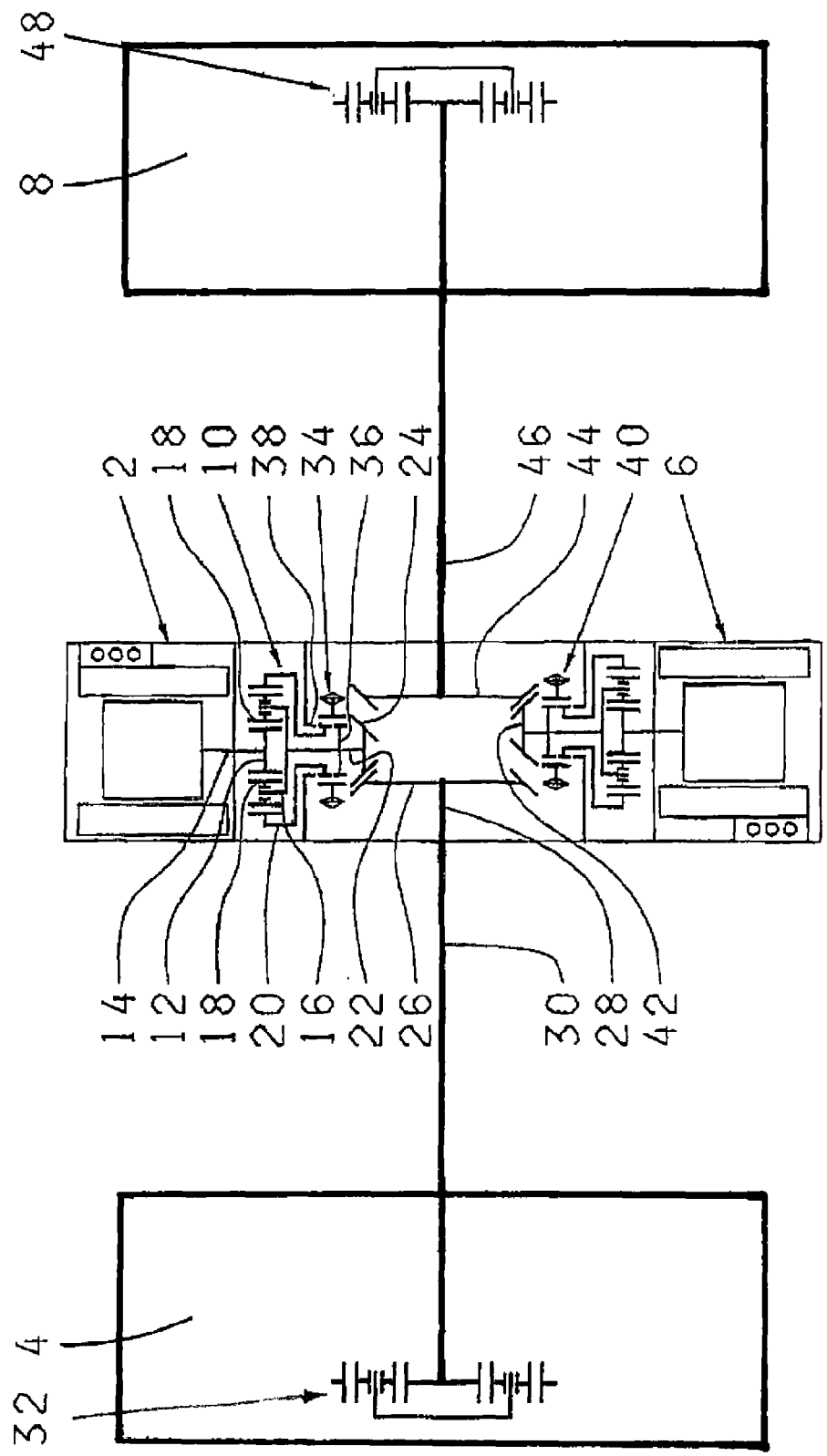
FIG. 1 is a diagrammatic view of a drive system in which a shiftable transmission is downstream of each transmission drive and a bevel gear transmission is downstream of the shiftable transmission.

In FIG. 1, a drive system comprises a first transmission drive 2 which is associated with a first drive wheel 4, as well as a second transmission drive 6, which is associated with a second drive wheel 8.

A two-step shiftable transmission 10, designed as a planetary gearset, is downstream of the first transmission drive 2. A sun gear 12 of the transmission 10 is connected with a drive shaft 14 of the transmission drive 2 and engages several planetary gears 18 arranged on a planetary gear carrier 16, which on the other side, engage with the internal teeth of a ring gear 20.

The planetary gear carrier 16 is connected with an output shaft 22 which carries, on its free end, a bevel gear 24, which meshes with a bevel gear 26. The bevel gear 26 is connected with an outlet shaft 28 which is drivingly connected to the first drive wheel 4 by way of a cardan shaft 30.

The cardan shaft 30 makes spring suspension of the drive wheel 4 possible, as is generally known, and is not explained in greater detail. The drive wheel 4 is driven by the cardan shaft 30 by way of an additional planetary gearset 32, as is likewise known in principle, and for this reason is not explained here again.

The transmission 10 is designed as a two-stage shiftable transmission. For this purpose, the ring gear 20, by way of a pinion 34, can be selectively connected to a gear wheel 36 secured to the output shaft 22, as shown in FIG. 1, or to locking teeth 38 secured in the transmission housing. With the shift position shown in FIG. 1, the planetary gear carrier 16 and the ring gear 20 are coupled in a rotationally fixed manner. There is no rotation of the planetary gears 18 with respect to the ring gear 20 and thus also none with respect to the sun gear 12 so that the output shaft 22 rotates with the rotational speed of the drive shaft 14.

If the ring gear 20 is coupled with the locking teeth 38 by way of the pinion 24, then the ring gear 20 is locked to the housing, and the planetary gears 18 rotate relative to the internal teeth of the ring gear 20 so that the rotational speed of the drive shaft 14 is translated, in a known manner, into different rotational speed of the output shaft 22.

The drive system associated with the second drive wheel 8 is identical to the drive system described above. It comprises a two-stage shiftable transmission 40 designed as a planetary gearset downstream of the second transmission drive 6, a bevel gear transmission formed from bevel gears 42 and 44, a cardan shaft 46 and a further planetary gearset 48 associated with the second drive wheel 8.

The two drive wheels 4 and 8 are each driven independently of the other by the associated transmission drives 2 or 6. Power transfer from one side to the other does not take place.

Accordingly, the drive rotational speed or the drive torque of the vehicle is controlled by way of the shiftable transmissions 10 and 40.

In order to initiate negotiation of a curve, one of the two drive wheels 4 and/or 8 is slowed or accelerated by way of the corresponding rotational speed control of the associated transmission drive 2, 6 so that the vehicle negotiates the curve as a consequence of the different drive wheel speeds.

Figure 2:
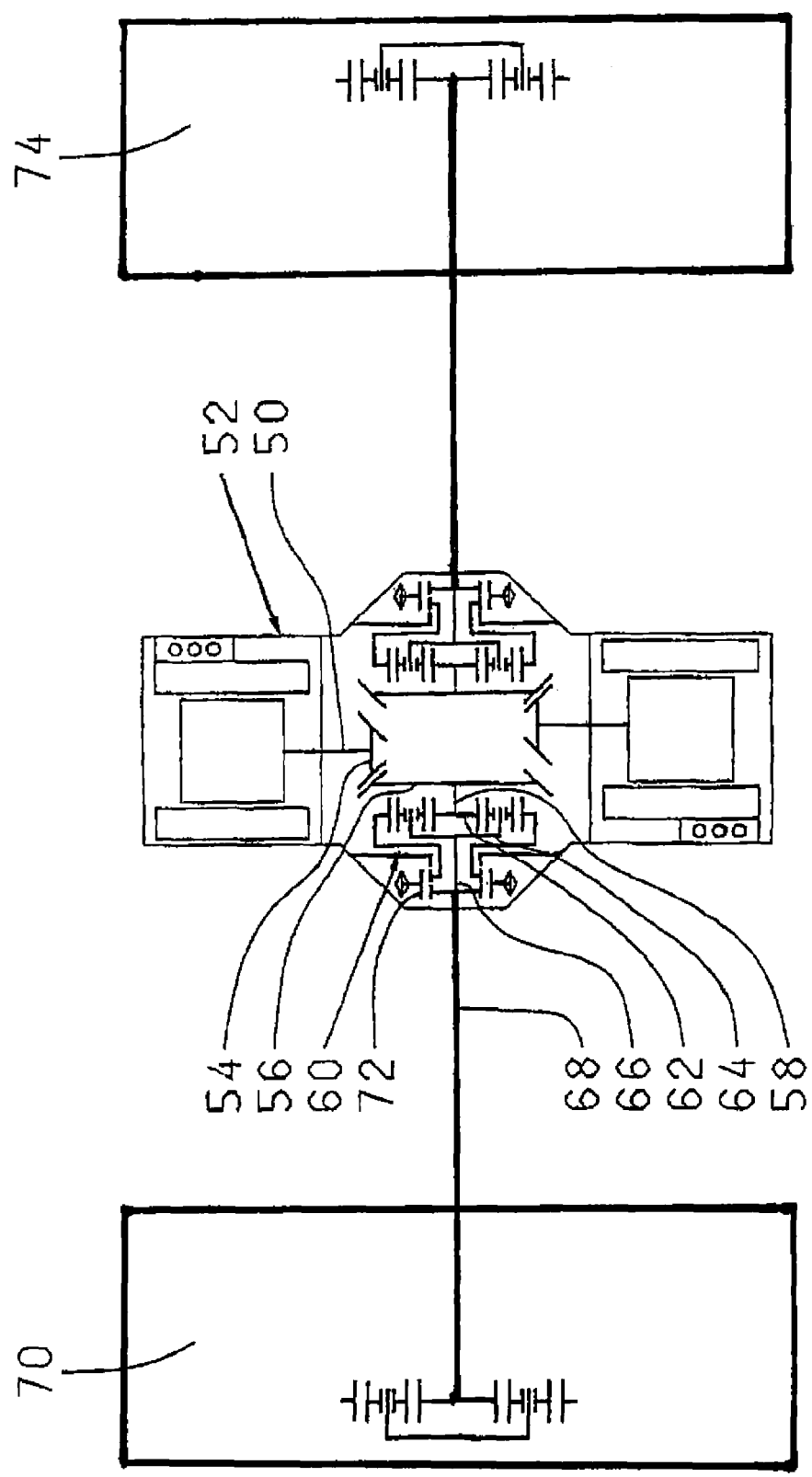
FIG. 2 is a diagrammatic view of a drive system in which a bevel gear transmission is downstream of each transmission drive and a shiftable transmission downstream of the bevel gear transmission.

FIG. 2 depicts an arrangement similar to that of FIG. 1 but, in contrast to it, the bevel gear transmission is downstream of the transmission drive and the shiftable transmission is downstream of the bevel gear transmission. The drive system, according to FIG. 2, will be explained using the example of a drive for the drive wheel 70. A drive shaft 50 of a transmission drive 52 carries a bevel gear 54 which engages with a bevel gear 56. The bevel gear 56 is connected to an input shaft 58 of a shiftable transmission (planetary gearset) 60 which drives a sun gear 62. A drive shaft 66 connected to a planetary gear carrier 64 drives the drive wheel 70 by way of a cardan shaft 68 with which an additional planetary gearset is also associated.

As in the example of FIG. 1, the transmission 60 is shiftable, between two shifting stages) by shifting a pinion 72.

The drive system associated with a drive wheel 74 has the identical design so that it need not be described once again.

As in the example in FIG. 1, there is no power transfer connection, between the drives of the two drive wheels 70 or 74, with this drive system.

Figure 3:
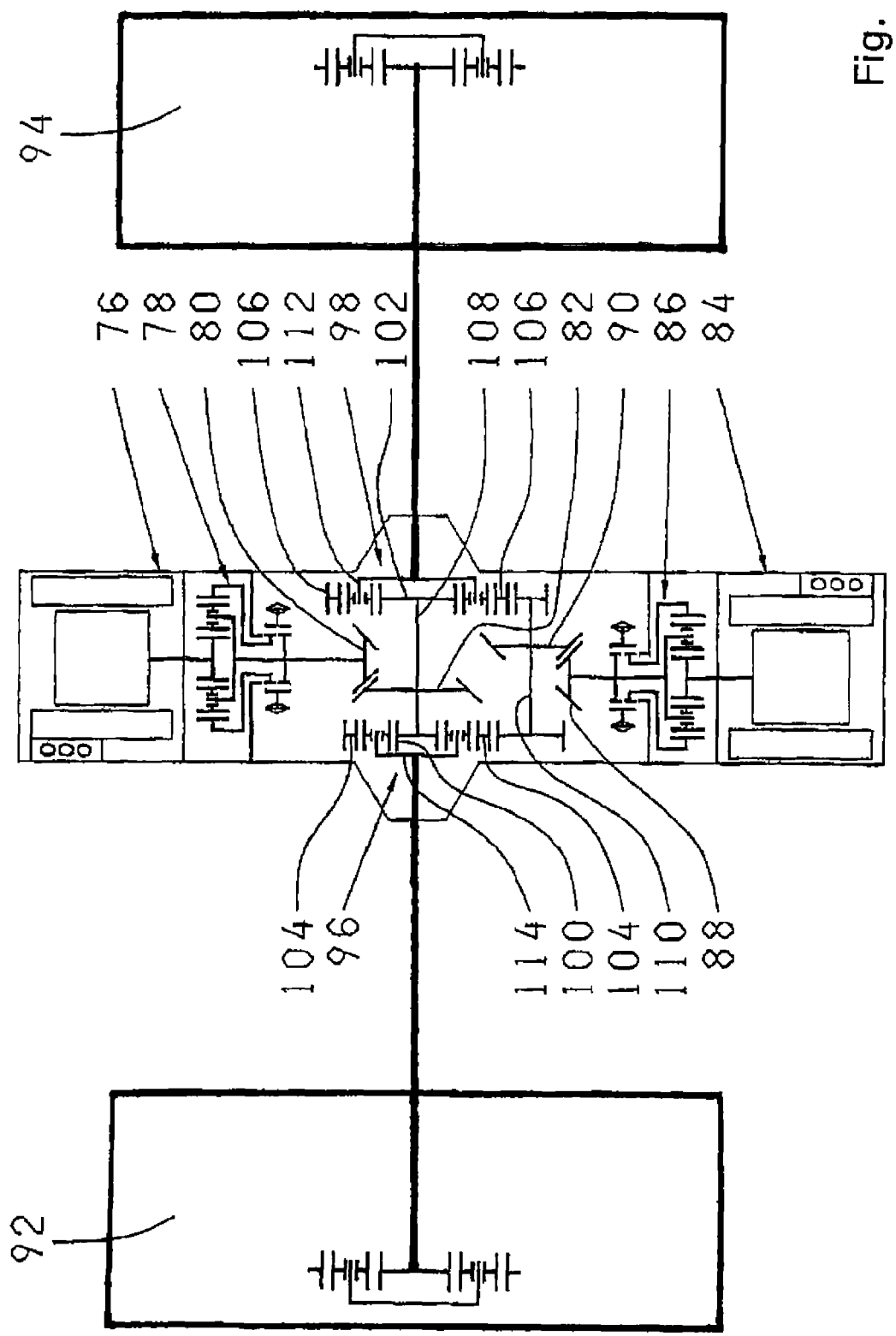
FIG. 3 is a diagrammatic view of an arrangement approximately in accordance with FIG. 1, where a summation unit is downstream of the bevel gear transmission.

FIG. 3 illustrates a drive system in which a two-stage shiftable transmission 78 designed as a planetary gearset is downstream of a first transmission drive 76, and a bevel gear transmission formed from two bevel gears 80 and 82 is downstream of the former. In a similar manner, a two-stage shiftable transmission 86 is downstream of a second transmission drive 84 and a bevel gear transmission, formed from a bevel gear 88 and bevel gear 90, is downstream of the former.

The two bevel gears 82 or 90 do not directly drive associated drive wheels 92 or 94, as in the exemplary embodiment of FIG. 1, but rather they are coupled with a summation unit 96 or 98 associated with these drive wheels 92 or 94, as will be explained in greater detail below.

The summation units 96 and 98 are both designed as planetary gearsets whose sun gears 100 or 102 form, in each case, a first transfer element, and its ring gears 104 or 106 form a second transfer element, by way of which the drive torques are overlapped and directed to the summation units 96 or 98.

The bevel gear 82 is secured to a connection shaft 108 which drives the sun gears 100 or 102. The bevel gear 90 is connected to a connection shaft 110 and drives the ring gears 104 or 106 by way of external teeth constructed thereon.

The transmission ratios of the connection shaft 108 in relation to the summation units 96 and 98 are different so that the respective input rotational speed of the summation units 96 or 98 are different.

The transmission ratios from the connection shaft 110 to the summation units 96 or 98 are, likewise, different and are opposed to the transmission ratios of the connection shaft 108 such that the rotational speed of the transmission drives 76 or 84, is identical to the speed of the driven wheels 92 or 94.

For example, if the transmission drive 76 is slowed going into a curve, then given the represented transmission ratios, the rotational speed of a planetary gear carrier 112 of the summation unit 98 transmitted by way of the connection shaft 108 slows faster than the rotational speed of a planetary gear carrier 114 of summation unit 96 so that the drive wheel 94 also rotates slower than the drive wheel 92.

The drive torque not utilized by the drive wheel 94 is transferred through the connection shaft 110 to the drive wheel 92 so that no drive output is lost.

| Reference numerals | |
|---|---|
| 2 | first transmission drive |
| 4 | drive wheel |
| 6 | second transmission drive |
| 8 | second drive wheel |
| 10 | shiftable transmission |
| 12 | sun gear |
| 14 | drive shaft |
| 16 | planetary gear carrier |
| 18 | planetary gears |
| 20 | ring gear |
| 22 | output shaft |
| 24 | bevel gear |
| 26 | bevel gear |
| 28 | outlet shaft |
| 30 | cardan shaft |
| 32 | planetary gearset |
| 34 | pinion |
| 36 | shifting gear |
| 38 | locking teeth |
| 40 | shiftable transmission |
| 42 | bevel gear |
| 44 | bevel gear |
| 46 | cardan shaft |
| 48 | planetary gearset |
| 50 | drive shaft |
| 52 | transmission drive |
| 54 | bevel gear |
| 56 | bevel gear |
| 58 | input shaft |
| 60 | shiftable transmission |
| 62 | sun gear |
| 64 | planetary gear carrier |
| 66 | drive shaft |
| 68 | cardan shaft |
| 70 | drive wheel |
| 72 | pinion |
| 74 | drive wheel |
| 76 | first transmission drive |
| 78 | shiftable transmission |
| 80 | bevel gear |
| 82 | bevel gear |
| 84 | second transmission drive |
| 86 | shiftable transmission |
| 88 | bevel gear |
| 90 | bevel gear |
| 92 | drive wheel |
| 94 | drive wheel |
| 96 | summation unit |
| 98 | summation unit |
| 100 | sun gear |
| 102 | sun gear |
| 104 | ring gear |
| 106 | ring gear |
| 108 | connection shaft |
| 110 | connection shaft |
| 112 | planetary gear carrier |
| 114 | planetary gear carrier |

The invention claimed is:

1. A drive system for individually driving each wheel of a drive wheel pair of a motor vehicle, the drive system comprising:
two infinitely variable transmission drives each of which are respectively drivingly connected, via a drive arrangement, to one wheel of the drive wheel pair;
each of the drive arrangements comprising two drive units arranged successively;
a first drive unit of the two drive units being a shiftable transmission and a second drive unit of the two drive units being a bevel gear transmission having a fixed transmission ratio;
each of the two infinitely variable transmission drives directly driving one of the two drive units of the respective drive arrangement; and
the shiftable transmissions of the drive arrangements are coaxially aligned with a rotational axis of the drive wheel pair.

2. The drive system according to claim 1, wherein a drive shaft of each of the two variable transmission drives is arranged at right angles with respect to a rotational axis of the drive wheel pair, and each of the bevel gear transmissions of the drive arrangements has a deflection angle of 90°.

3. The drive system according to claim 1, wherein the two infinitely variable transmission drives are electric motors.

4. The drive system according to claim 1, wherein
each of the two infinitely variable transmission drives directly drives the second drive unit of the respective drive arrangement.

5. A drive system for individually driving each wheel of a drive wheel pair of a motor vehicle, the drive system comprising:
two infinitely variable transmission drives each of which are respectively drivingly connected, via a drive arrangement, to one wheel of the drive wheel pair;
each of the drive arrangements comprises two drive units arranged successively;
a first of the two drive units is a shiftable transmission and a second drive unit of the two drive units is a bevel gear transmission having a fixed transmission ratio; and
the bevel gear transmission is located downstream of the variable transmission drive, and the shiftable transmission is located downstream of the bevel gear transmission.

6. A drive system for individually driving each wheel of a drive wheel pair of a motor vehicle, the drive system comprising:
two infinitely variable transmission drives each of which are respectively drivingly connected, via a drive arrangement, to one wheel of the drive wheel pair;
each of the drive arrangements comprising two drive units arranged successively;
a first drive unit of the two drive units being a shiftable transmission and a second drive unit of the two drive units being a bevel gear transmission having a fixed transmission ratio;
each of the two infinitely variable transmission drives directly drives one of the two drive units of the respective drive arrangement;
wherein a summation unit, with a first transfer element and a second transfer element to transmit drive torque, is located downstream of each of the drive arrangements, the summation unit combines the drive torque from the first transfer element and the drive torque from the second transfer element, which drive an output element, the first transfer element of each of the summation units are coupled to the respective second transfer element of each of the summation units via a first gear train, which is driven by a first transmission drive of the two infinitely variable transmission drives and a second gear train, which is driven by a second transmission drive of the two infinitely variable transmission drives, and transmission ratios of the first gear train and the second gear train with respect to the first transfer element and the second transfer element are unequal and in opposite directions.

* * * * *